United States Patent

Buss

[11] Patent Number: 6,059,310
[45] Date of Patent: May 9, 2000

[54] KNEE PROTECTION DEVICE

[75] Inventor: Winfried Buss, Limburg, Germany

[73] Assignee: BSRS Restraint Systems GmbH, Alzenau, Germany

[21] Appl. No.: 09/008,800

[22] Filed: Jan. 20, 1998

[30] Foreign Application Priority Data

Jan. 21, 1997 [DE] Germany .............. 197 01 709

[51] Int. Cl.[7] .................................. B60R 21/24
[52] U.S. Cl. ........................ 280/729; 280/743.1
[58] Field of Search ................. 280/729, 730.1, 280/732, 734, 743.1, 752, 753

[56] References Cited

U.S. PATENT DOCUMENTS

| | | | |
|---|---|---|---|
| 3,702,706 | 11/1972 | Sobkow ........................ | 280/730.1 |
| 3,951,427 | 4/1976 | Wilfert .......................... | 280/732 |
| 5,529,337 | 6/1996 | Takeda et al. .................. | 280/729 |

FOREIGN PATENT DOCUMENTS

| | | |
|---|---|---|
| 0 739 790 A2 | 10/1996 | European Pat. Off. . |
| 39 34 588 A1 | 4/1991 | Germany . |
| 4305050 | 2/1993 | Germany . |
| WO 93/2103 | 10/1993 | Germany . |
| 195 14 681 A1 | 11/1996 | Germany . |
| 296 11 869 U1 | 12/1996 | Germany . |

*Primary Examiner*—Eric Culbreth
*Assistant Examiner*—Christopher D. Bottorff
*Attorney, Agent, or Firm*—Akin, Gump, Strauss, Hauer & Feld, L.L.P.

[57] ABSTRACT

A knee protection device is provided for a person sitting on a seat situated inside a motor vehicle, in case of an accident-related deformation of the leg space. The knee protection device has an air bag module allocated to the leg space with at least one first gas bag (1), into which a gas generator allocated to it introduces gas instantaneously upon a trigger signal, and which is provided with a load distribution plate (2) connected to it on the side facing towards the vehicle interior. The load distribution plate is displaced in the vehicle interior in the direction towards the knee area of the person during the filling operation of the gas bag (1). The load distribution plate is provided with a damping pad (3), on the side facing towards the vehicle interior. The damping pad is preferably formed from a second gas bag (4), which is inflated to its size prior to the first gas bag (1).

5 Claims, 1 Drawing Sheet

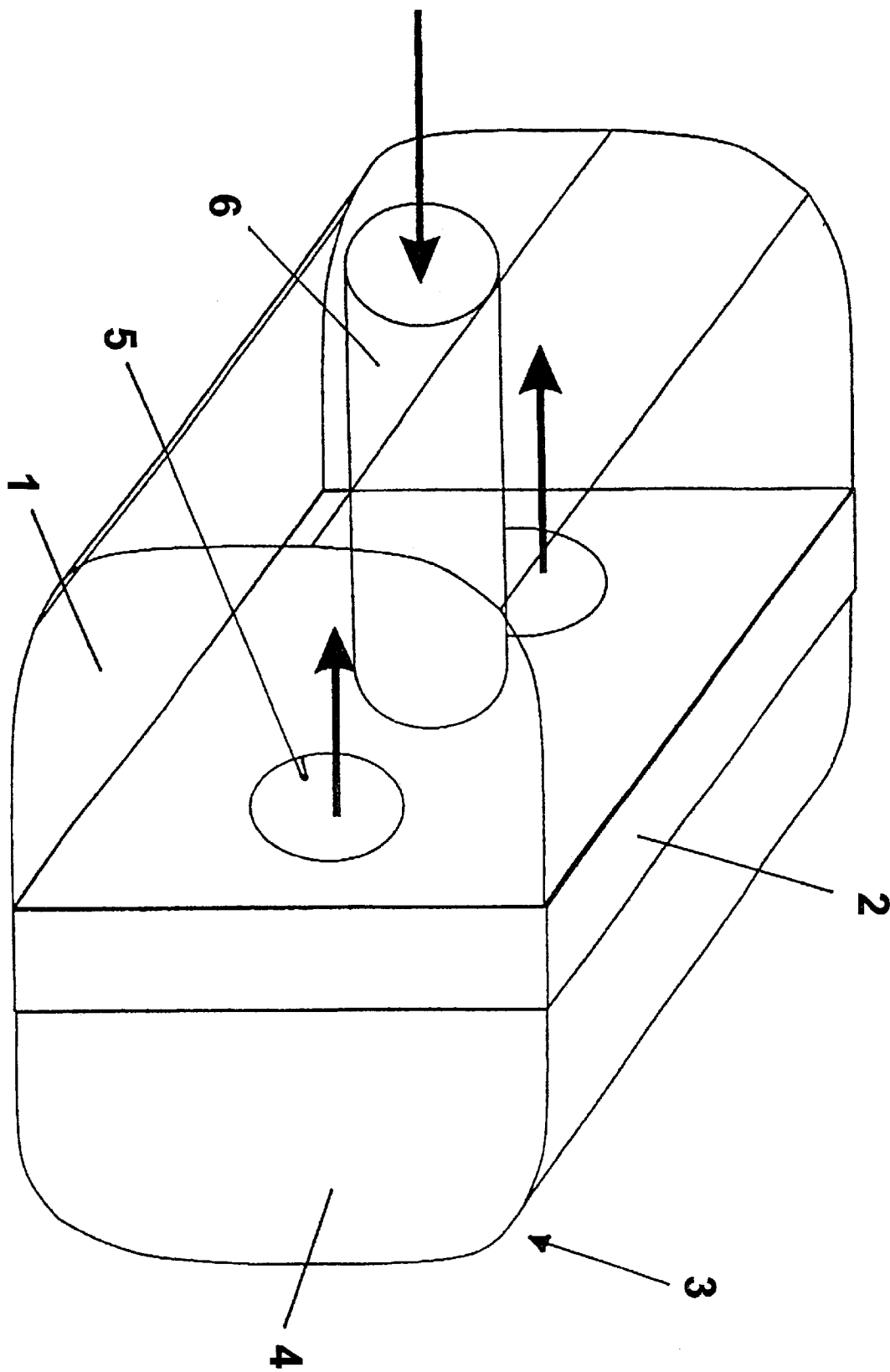

KNEE PROTECTION DEVICE

BACKGROUND OF THE INVENTION

The present invention involves a knee protection device for a person sitting on a seat situated inside a motor vehicle. The device functions action in case of an accident-related deformation of the leg space of the interior space of the motor vehicle.

A knee protection device of this type is known for example from EP-A-0 684 164. It is proposed therein to provide, as a knee protection device, a rebound plate which comes into contact with the knee of the vehicle passenger during an accident-related deformation of the leg or knee space of the passenger compartment. On the backside, i.e. towards the dashboard, the rebound plate is connected to an airbag, which is filled instantaneously with gas from a gas generator upon a trigger signal. This solution makes it possible to design the leg and knee space of the motor vehicle as large as possible in the non-activated condition of the protection device, and nevertheless to instantaneously shift the rebound plate, as a passive restraint component, in the direction of the motor vehicle passenger during an impact of the motor vehicle.

The rebound plate prevents a high local introduction of force into the airbag by a knee contact and considerably increases the surface contributing to the energy absorption. Correspondingly, the required internal pressure in the airbag can turn out to be clearly reduced in comparison to a knee airbag without a rebound plate. This means that the airbag can be made of fabric conventional to the industry, and no expensive special material needs to be used, which would be expended for considerably higher internal pressures. Furthermore, one can get by with a considerably lower quantity of gas in comparison to systems without rebound plates. This can have a favorable effect on the reduction of the structural size of the generator so that sufficient space remains, for example, for storage areas in the dashboard of the motor vehicle.

It is found to be disadvantageous in the known knee protection device that the rebound plate, or also the load distribution plate, comes into a direct contact with the knees. According to such devices, the rigid mass of the plate hits on the knee directly.

From DE 296 11 869 U1 a knee restraint device is known for motor vehicles, in which an airbag is provided on the motor vehicle and in front of which a base plate is mounted, on which another so-called knee catch plate is placed towards the interior of the motor vehicle. This knee catch plate is made of foamed plastic and has within certain limits a damping effect during the initial contact with the knees of the vehicle passenger after an impact of the motor vehicle.

From DE 39 34 588 A1 a restraint system for the knee of a driver in a motor vehicle has become known, in which a first chamber facing towards the motor vehicle is a sheet metal hollow body, which connects to a wall which, with a covering, encloses a space housing a gas bag. The sheet metal hollow body should, in the activated condition, thereby form a deformation component which should be able to convert the impact energy of the knee over a relatively long distance. This system, on account of the sheet metal hollow body, is a relatively rigid system having a construction-based weight which is not insignificant, and thus has a relatively high injury potential if the vehicle passenger sits, for example, with his knee relatively close to the dashboard. The durability of the system could also be problematic, and here specifically at the bends of the sheet metal hollow body. After a relatively long standing time problems could occur at the bends in case of activation.

BRIEF SUMMARY OF THE INVENTION

Against this background, and proceeding from DE 296 11 869 U1, it is an object of the present invention to further develop the knee protection device, so that the impact of the plate on the knee is further dampened. The object is achieved by a knee protection device comprising an airbag module allocated to the leg space of a person sitting on a seat located in a motor vehicle interior, the airbag module having at least one first gas bag, a generator for introducing gas instantaneously into the first gas bag upon a trigger signal, and a load distribution plate connected to the first gas bag on its side facing the vehicle interior, wherein the load distribution plate is displaceable in the vehicle interior in a direction towards a knee area of the person during filling of the first gas bag, and the load distribution plate is provided with a second gas bag on its side facing the vehicle interior such that the second gas bag is also filled with gas upon a trigger signal, and wherein the filling of the gas bags is coordinated such that the second gas bag is inflated to its full size prior to the first gas bag. Further advantageous embodiments result from the features of the dependent claims.

The aforementioned second airbag is thus located on the load distribution plate and faces towards the knee space. The gas bag which displaces the load distribution plate in the direction towards the knee space is located between the dashboard and the load distribution plate. Upon activation, the second airbag is thus filled with gas, before the load distribution plate is displaced in the direction towards the knee of the motor vehicle passenger. The contact between the knees and the load distribution plate is clearly damped off by the second airbag, before the load distribution plate takes on its maximum displacement position, in order to then exhibit its restraint action and force distribution effect. In contrast to the known system, the structural space and the weight of the system increase only slightly so that for an optimal damping action, a maximum knee and leg space is maintained in the vehicle in the inactivated condition of the device.

The knee protection device preferably has an airbag module having a multiple chamber gas bag, in which one chamber forms the first gas bag between the dashboard and the load distribution plate, and another chamber forms the second gas bag as a damping pad. As a result, the technical equipment expense is considerably reduced as opposed to the conceivable solution that both gas bags are made independently of each other.

The above-mentioned embodiment can advantageously be further constructed in that both gas bags are connected to each other in a flow enabling manner and are filled with gas from the same gas generator, wherein the gas is conducted first into the second gas bag, from where it passes over into the first bag. In this manner, the time target is met, namely that the second gas bag is inflated before the first gas bag between the dashboard and the load distribution plate. The connection of only one gas generator in turn reduces the technical equipment expense and the costs.

In the above-mentioned embodiment, the fluid connection between the two gas bags can be constructed advantageously by at least one throughput opening in the load distribution plate, and in the areas of the opening(s) both gas bags are attached to the load distribution plate with corresponding transition openings.

Furthermore, according to a still further advantageous embodiment, it is provided that the gas is conducted upon the trigger signal from the single gas generator through a tube first into the second gas bag. After the second gas bag is inflated, the gas can flow through the aforementioned throughput openings in the load distribution plate into the first gas bag, and the gas bag can perform its displacement function and, of course, the function of energy absorption.

Finally, it can be provided to adapt the internal pressure of the first gas bag to passenger parameters and to compensate the variable speed of the load distribution plate resulting therefrom, by adapting the pressure in the second gas bag.

The passenger parameters can be, for example, his weight or his position on the seat. By the aforementioned further construction it is possible, by prior determination of the passenger parameters, to calculate and determine in advance a specific progression during the activation of the knee protection device, as this is otherwise known to apply from the field of frontal air bags.

BRIEF DESCRIPTION OF THE DRAWINGS

The foregoing summary, as well as the following detailed description of the invention, will be better understood when read in conjunction with the appended drawing. For the purpose of illustrating the invention, there is shown in the drawing an embodiment which is presently preferred. It should be understood, however, that the invention is not limited to the precise arrangements and instrumentalities shown. In the drawings:

The single FIGURE shows schematically in a perspective view a knee protection device of the invention in the unfolded, i.e. activated condition.

DETAILED DESCRIPTION OF THE INVENTION

On the dashboard of the motor vehicle an airbag module is attached, here having a two-chamber gas bag with the first gas bag 1 and the second gas bag 4, such that the gas bag 4 faces towards the motor vehicle passenger as a damping pad 3. The load distribution plate 2, attached to the first gas bag 1, is mounted in front of the first gas bag 1 in the direction towards the passenger compartment. The second gas bag 4 is attached to the load distribution plate 2, so that the knee protection device has a sandwich-type construction. In the load distribution plate 2, throughput openings 5 are provided, which correspond with matching transition openings in the two gas bags 1 and 4.

Through the first gas bag 1 runs a tube 6 from the dashboard through the load distribution plate 2 and opens into the second gas bag 4. The end of the tube on the dashboard side is connected to a gas generator (not shown).

Upon a trigger signal, the gas generator conducts gas through the tube 6, as indicated by the corresponding arrow, first into the second gas bag 4, which thereupon carries out its damping function as a damping pad 3. Only after the gas has flown into the second gas bag 4, can it flow through the throughput openings 5 in the load distribution plate 2 (and through the matching openings in the gas bags 1 and 4) into the gas bag 1, whereupon this gas bag 1 displaces the load distribution plate 2 instantaneously in the direction towards the knee of the motor vehicle passenger. The flow of the gas out of the gas bag 4 through the throughput openings 5 is indicated by corresponding arrows.

This constructive design makes it possible that the first contact of the knee with the knee protection device proceeds at first in a damping manner with the filled gas bag 4, and only after that does the load distribution plate 2 perform the desired restraint function together with the first gas bag 1, and the introduction of force occurs into the gas bag 1 and/or into the structure supporting it. The first contact with the knee protection device is thus considerably damped off by the inflated gas bag 4. It is to be noted here that the second gas bag 4 performs no real function of the load distribution plate 2, but instead cushions the hard contact between the load distribution plate 2 and the knees of the motor vehicle passenger.

As already known to apply from the frontal air bag field, the protection effect of the gas bag can be optimized by adaptation of the air bag internal pressure to different passenger parameters, as for example the passenger weight or the passenger position. This is also as possible here for the first gas bag 1 for energy absorption. In the present case, an adaptation of the internal pressure in the second gas bag 4 is, of course, also necessary. Sensors (not shown) determine the passenger parameters, such as weight or sitting position, and send the determined values to an electronic device of an evaluation unit in advance, i.e. prior to an ignition of the gas generator. At the point in time of ignition of the gas generator, the target pressure for the energy-absorbing first gas bag 1 is thus already determined. The level of this target pressure in the first gas bag 1 determines the preliminary displacement speed and thus the kinetic energy of the load distribution plate. In order to optimally design its contact with the knee of the passenger, i.e. as damped as possible, the second gas bag 4 must also have a hardness suited to the preliminary displacement speed of the load distribution plate 2. This can be achieved by a variable internal pressure of the second gas bag 4.

At the point in time of the ignition of the knee protection device—as mentioned above the passenger parameters are known, and thus also the internal pressure of the energy-absorbing first gas bag 1 and the preliminary displacement speed of the load distribution plate 2 are predetermined. For this reason, the second gas bag 4 can be adapted to the subsequent happenings, although it is activated prior to the first gas bag 1.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A knee protection device for a person sitting on a seat located in a motor vehicle interior, in case of an accident-related deformation of the leg space, comprising an air bag module allocated to the leg space, the air bag module having at least one first gas bag (1), a load distribution plate (2) connected to the first gas bag on its side facing the vehicle interior, the load distribution plate being displacable in the vehicle interior in a direction towards a knee area of the person during filling of the first gas bag (1), and the load distribution plate (2) being provided with a second gas bag (4) on its side facing the vehicle interior, the second gas bag also being filled with gas upon a trigger signal, wherein the filling is coordinated such that the second gas bag (4) is inflated to its full size prior to the first gas bag (1).

2. The knee protection device according to claim 1, wherein the air bag module has a multiple chamber gas bag in which one chamber forms the first gas bag (1) and another chamber forms the second gas bag (4).

3. The knee protection device according to claim 1, wherein both gas bags (1, 4) are connected to each other in a flow-enabling manner and are filled with gas, and wherein the gas is first conducted into the second gas bag (4) from where it passes over into the first gas bag (1).

4. The knee protection device according to claim 3, wherein the flow-enabling connection between both gas bags (1, 4) is formed by at least one throughput opening (5) in the load distribution plate (2), both gas bags (1, 4) being attached with corresponding transition openings in areas of the throughput openings (5) on the load distribution plate (2).

5. The knee protection device according to claim 3, wherein the gas is first conducted upon a trigger signal through a tube (6) into the second gas bag (4).

* * * * *